3,232,983
UREA SYNTHESIS
Donald R. Flinn, Sacramento, Calif., assignor to Pullman Incorporated, a corporation of Delaware
Filed Jan. 8, 1960, Ser. No. 1,354
9 Claims. (Cl. 260—555)

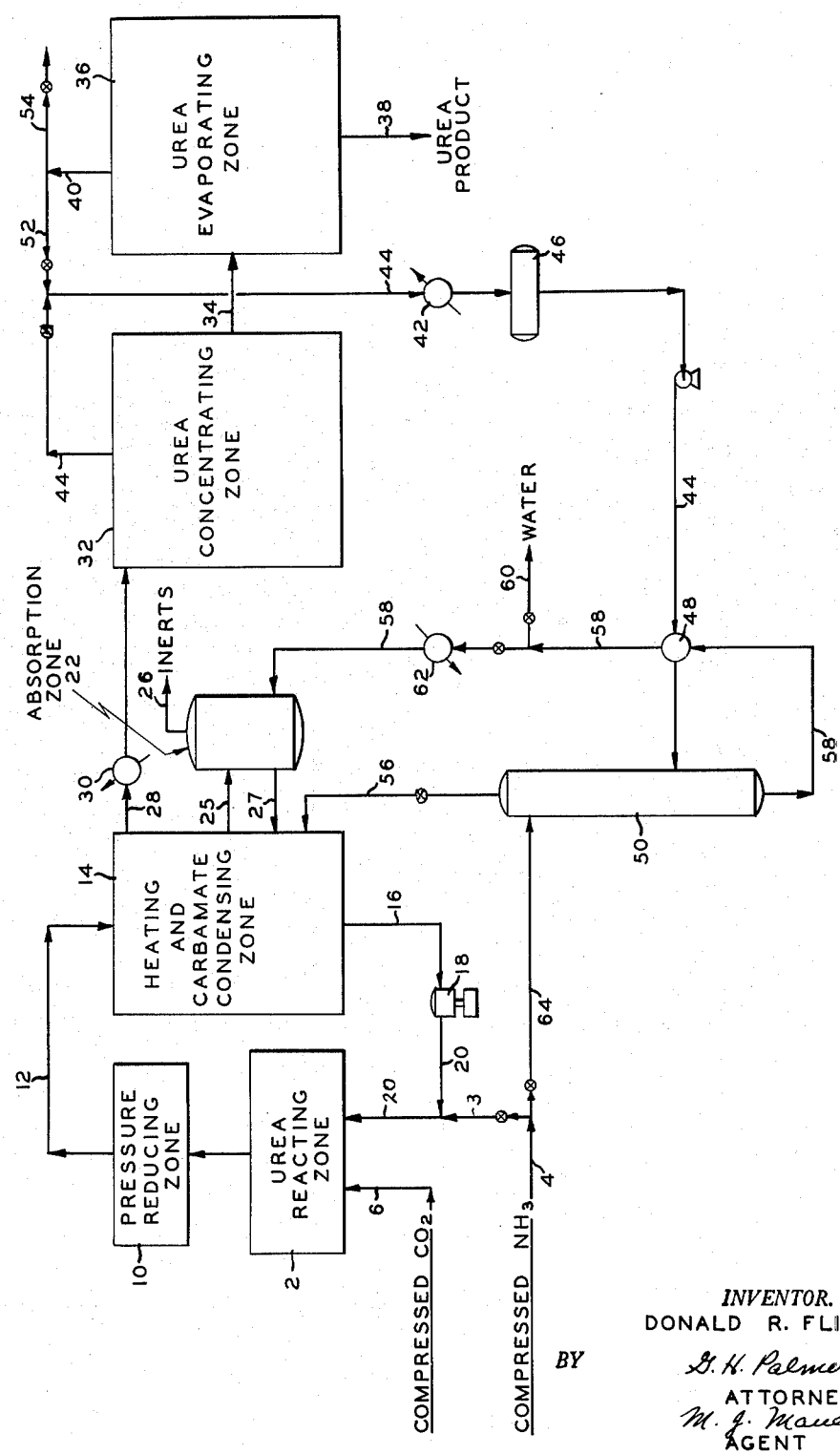

The invention study relates to a process for synthesizing urea from ammonia and carbon dioxide. In one aspect this invention relates to a process for obtaining a higher conversion of carbon dioxide and ammonia to urea. Another aspect of this invention relates to the total recycle of unreacted carbon dioxide and ammonia in a process for the synthesis of urea.

It is well known that urea can be synthesized by reacting ammonia and carbon dioxide under relatively high temperatures and pressures to produce a melt containing urea, water and ammonium carbamate. The urea is separated from the carbamate by-product, and the by-product is recycled to the urea reactor under the conditions employed therein. It has also been the practice in the art to further concentrate and recover urea from the liquid fraction after separation of the carbamate intermediate product. In concentrating liquid urea, it has been found that the liquid urea fraction contains at least 60 percent urea while the remainder of the mixture in the concentrator is comprised of ammonia, carbon dioxide and water. Thus, up to about 40 percent of the mixture may be separated as a vapor from the liquid urea product.

Because the ammonia conversion to urea is usually only about 50 percent per pass, there is always the problem of what to do with unreacted ammonia and carbon dioxide. Some manufacturers have solved the problem by simply using these unreacted components in other processes. However, since the demand for urea is growing faster than the demand for its by-products, most urea synthesis processes include at least a partial recovery of unconverted reactants as by the recovery and recycle of ammonium carbamate and in all processes total recovery is highly desirable.

Some techniques have been developed for totally recovering the ammonia and carbon dioxide values during the concentration of urea in the urea synthesis process, for, with total recovery of reactants, the economics of the above process can be markedly improved and 100 percent conversion of $CO_2$ and $NH_3$ to urea can be obtained. Thus, in order to obtain total recovery and recycle of these gases, elaborate methods for separately recovering and compressing carbon dioxide and ammonia have been proposed. One of these methods involves the use of a selective adsorption tower wherein the ammonia is chemically absorbed in an absorbent and the carbon dioxide is released as a vapor, for recycle to the urea reactor after sufficient compression. The absorbed ammonia is then desorbed, separately compressed and recycled to the reactor. Another method which is somewhat similar to that described above, is the absorption of carbon dioxide in solutions such as monoethanolamine in order to free the ammonia component. As above, the carbon dioxide is desorbed, compressed and recycled, and the ammonia is separately compressed and recycled to the reactor.

Although the above methods have been employed, it has been found that the cost of operation is enormously increased by the intricate steps involved and the cost of the chemicals used in this recovery process. Other disadvantages in the above methods include the multiplicity of operations necessary for the recovery and the high compression demands in the recovery of the overall processes.

Therefore, it is an object of the present invention to overcome the difficulties outlined above and to provide a simplified and more economical method of recovering ammonia and carbon dioxide reactants.

Another object of this invention is to provide a commercially feasible and economical process for the total recycle of unreacted carbon dioxide and ammonia in the synthesis of urea.

Still another object of this invention is to provide a process for the synthesis of urea having a higher percent conversion of carbon dioxide than other processes employed in the synthesis of urea.

Another object of this invention is to provide a method for lowering the compression requirements of a total recycle urea synthesis process.

These and other objects of this invention will become apparent to those skilled in the art from the following description and disclosure.

According to the present invention, a urea synthesis mixture, obtained from the reaction between carbon dioxide and amomnia, from which the ammonium carbamate intermediate product has been removed, is passed to a urea concentrator wherein a concentrated solution of urea is separated from a vaporous fraction containing carbon dioxide, ammonia and water. The aqueous urea solution is passed to an evaporator wherein the remaining water is separated as a vapor from the liquid urea product. The vaporous fraction from the concentrator is condensed and passed to a fractionator wherein vaporous carbon dioxide and ammonia are separated from water which remains as a liquid.

In a preferred embodiment of the present invention, both the vaporous fraction from the concentrator and the vaporous fraction from the evaporator are condensed and passed to the fractionator for separation of unconverted reactants.

The vaporous carbon dioxide and ammonia mixture is then withdrawn from the fractionator and recycled to the urea reactor as part of the feed thereto under the operation conditions employed therein.

Another preferred modification of the present process, when it is desirable to supply a more anhydrous recycle from the fractionator to the reactor, involves passing at least a portion of the anhydrous ammonia feed to the fractionator in order to concentrate the ammonia vapors formed therein and aid in washing out water from these vapors.

Generally the process for synthesizing urea comprises reacting carbon dioxide with an excess, over the 1:2 stoichiometric mole ratio, of ammonia in a high pressure reactor or autoclave. The mole ratio of carbon dioxide to ammonia during the synthesis reaction is usually between about 1:2.5 and about 1:15, while the operating conditions are maintained at a temperature of between about 300° F. and about 500° F. under from 1700 p.s.i.a. to about 3500 p.s.i.a., although pressures up to 8000 p.s.i.a. as set forth in U.S. Patent 2,087,980 may be employed, if desired. The overall reaction is illustrated by the following equations:

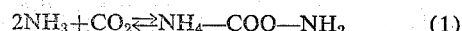
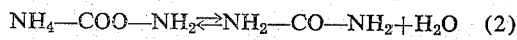

Since the overall reaction is exothermic, provision for cooling must be supplied and usually this condition is satisfied by employing a jacketed, water-cooled reactor. After reaction, the synthesis mixture, which is in the form of a melt, is withdrawn, depressurized or expanded to between about 150 p.s.i.g. and about 400 p.s.i.g. The depressurized synthesis mixture is then heated to vaporize the ammonium carbamate intermediate as carbon dioxide and ammonia vapors and the vapors including a small amount of water are rapidly withdrawn from the aqueous urea solution in a carbamate separating and condensing zone. In the carbamate separating and condensing zone, a major portion of the urea contaminants comprising ammonia and carbon dioxide are removed and the vaporous contaminants are condensed to reform an aqueous ammonium carbamate solution admixed with some free ammonia. The resulting condensate is then recycled to the reactor as part of the feed thereto at about the condensation temperature of the ammonium carbamate solution and below the temperature employed in the reactor and the pressure is adjusted to a pressure somewhat above that employed in the reactor.

After removing at least a major portion of the unconverted reactants as vapor, the aqueous urea fraction is passed to a urea concentrator wherein water and the remaining ammonia, carbon dioxide reactants are withdrawn as a vapor from the concentrated liquid urea solution. This solution is passed to an evaporator wherein water is stripped from the urea product. The vaporous water fraction thus stripped generally contains small amounts of residual carbon dioxide and ammonia. The urea product may be further treated by crystallization and/or prilling to suit the requirements of the manufacturer.

As hereinabove described, a major portion of the unconverted reactants are removed in the carbamate separating and condensing zone, preferably from about 65 percent to about 78 percent of the reactants in the reactor effluent. In a modification of the process described above for the synthesis of urea, the expanded and heated synthesis mixture from the reactor is passed to a first carbamate condenser where under a pressure of from about 150 p.s.i.g. to about 400 p.s.i.g., a major portion of the carbon dioxide and free ammonia and a minor portion of water are separated as vapors from the aqueous urea solution. The vapors are condensed and the resulting liquid, containing aqueous ammonium carbamate is recompressed and returned to the reactor. The aqueous urea solution is passed to a second carbamate condenser where, under a lower pressure of from about 0 p.s.i.g. to about 50 p.s.i.g., additional quantities of the unconverted reactants are separated as vapors. These reactants are separated and condensed in the second carbamate condenser in the manner set forth above. The resulting condensate is then pressurized, and recycled to the first carbamate condenser, at a temperature between about the condensation temperature in the first carbamate condenser and below the temperature employed in the reactor, for return to the reactor, with the ammonium carbamate solution separated in said first carbamate condenser.

It is to be understood, however, that the contaminants separated and condensed in the second carbamate condenser may be withdrawn, recompressed and directly recycled to the reactor at a temperature below reaction temperature, if desired. When employing this method of operation, the amount of ammonia and carbon dioxide reactants remaining in the aqueous urea solution withdrawn from the second carbamate condenser, is relatively small, i.e., below about 8 percent, and usually below about 5 percent. However, when only one carbamate condenser is employed, the amount of reactants remaining in the aqueous urea solution is between about 15 percent and about 40 percent based on reactants in the reactor effluent.

Each of the carbamate strippers are preferably provided with a reflux absorption zone from which inert gases which build up in the process can be removed and wherein the ammonia which enters the absorption zone with the inert gas is absorbed in an aqueous medium which is maintained in the absorber and the absorbed material is returned to the stripper in a manner hereinafter described.

The aqueous urea solution withdrawn from the last carbamate condenser is then heated and passed to a urea concentrator. In accordance with the present invention the urea concentrator comprises a vaporization zone wherein the above-described vaporous contaminants or unconverted reactants are removed from liquid urea product at a temperature of between about 190° F. and about 310° F. under from about 0 p.s.i.g. to about 150 p.s.i.g., preferably at a temperature of between about 200° F. and about 300° F. under from about 0 p.s.i.g. to about 70 p.s.i.g. The reactants removed in this stage of the process comprise not more than 40 percent of the total unconverted reactants in the reactor effluent and preferably about 25 percent of the total unconverted reactants when only one carbamate condenser is employed.

The concentrated liquid urea fraction withdrawn from the concentrating zone is passed to an evaporating zone wherein, at a temperature above the crystallization temperature of urea and between about 270° F. and about 330° F. under between about −14.7 p.s.i.g. and about 30 p.s.i.g., the remaining portion of water, and any reactants entrained therewith are removed from the urea product.

The vaporous fraction from the urea concentrator or the vaporous fractions from the urea concentrator and the urea evaporator are then passed to a condenser where the vapors are totally condensed and the condensate is pumped to a higher pressure and passed into a fractionator.

The fractionator is operated at a pressure of between about 0 p.s.i.g. and about 600 p.s.i.g., at a bottom temperature of between about 200° F. and about 500° F., preferably between about 400 p.s.i.g. and about 550 p.s.i.g., at a bottom temperature between about 400° F. and about 500° F. The temperature employed therein, however, is maintained above the "salting-out" temperature of the ammonium carbamate and the pressure is preferably maintained above that which is employed in the zone or zones to which the effluents from the fractionator are recycled. The vaporous effluent from the fractionator, which comprises essentially ammonia and carbon dioxide is preferably recycled to a carbamate condenser and most desirably the second carbamate condenser when two are used in the process.

It is also possible to recycle the vaporous effluent from the fractionator to the first carbamate condenser, when two are employed. However, in preferred operation, a single carbamate condenser is employed thus providing a more simplified and economical process wherein 100 percent conversion of carbon dioxide to urea is achieved.

The remaining liquid fraction in the fractionator, i.e., water, can be withdrawn from the system. However, it has been found desirable to recycle a controlled portion of this water to the absorption zone as the absorption medium for the ammonia gas introduced thereto with the inert gas. The amount of water recycled is determined by the water requirement for maintaining ammonia carbamate in solution in the carbamate condensing zone to which the absorption solution is returned and generally, the amount of water in the urea reactor should not exceed 30 percent of the total components therein. Therefore, the water contained in the recycle stream or streams, should be controlled to avoid reaction mixtures in excess of this amount.

For a better understanding of the present invention reference will now be had to the accompanying drawing which illustrates a specific embodiment of the present invention and is not to be construed as unnecessarily limiting thereto.

Anhydrous ammonia and carbon dioxide in a ratio between about 2.5:1 and about 15:1, preferably between about 3:1 and about 7:1, are pressurized into urea reacting zone 2, from ammonia feed lines 3, 4 and 20 and carbon dioxide feed line 6, wherein, at a pressure of between about 1700 p.s.i.a. and about 3500 p.s.i.a. and a temperature of between about 250° F. and about 500° F., preferably between about 2400 p.s.i.a. and 2900 p.s.i.a. at from about 330° F. to about 400° F., the gases are reacted to form ammonium carbamate as an intermediate product, which in turn, is converted into urea and water. Since the reaction is highly exothermic, this step of the process is usually carried out in a water-cooled autoclave or an autoclave cooled by any other convenient coolant which is capable of controlling the temperature therein. After the materials have reacted, the mixture in the urea reacting zone is withdrawn through line 8, expanded in pressure reduction zone 10 and introduced into a first heating and carbamate condensing zone or stripper 14 by means of line 12.

In zone 14, the liquid mixture, which has been expanded to a pressure of between about 150 p.s.i.g. and about 400 p.s.i.g., preferably between about 180 p.s.i.g. and about 270 p.s.i.g. is heated to between about 200° F. and 350° F., preferably between about 250° F. and about 300° F. to vaporize ammonium carbamate as ammonia and carbon dioxide and the resulting vapors, also containing some water, are separated from the remaining aqueous urea solution and thereafter condensed to reform ammonium carbamate in the presence of water and excess ammonia. The carbamate condensate is withdrawn from zone 14 by means of line 16, passed to pump 18 wherein the liquid is compressed to at least the pressure employed in zone 2, and preferably above the pressure in zone 2, at a temperature above the "salting-out" temperature of the ammonium carbamate and the compressed carbamate condensate is recycled to zone 2 through line 20.

Since a small quantity of inert material is constantly being introduced into the system in the feed materials thereto and since this inert material builds up in the system, provision is made for the elimination of the inert gas. This is accomplished by passing a portion of the gases separated in the carbamate condenser through line 25 to absorption zone 22 containing water which serves as the absorption medium for ammonia and carbon dioxide or ammonium carbamate. The inert gaseous materials are vented from the absorption zone by line 26 and the solution containing ammonia and carbon dioxide is returned to the condensing zone by line 27.

The carbamate condenser preferably employed in the process of the present invention is a two-stage pressure vessel lined with stainless steel. The upper part of the vessel is a gas-liquid separator and the lower portion is a condenser equipped with a stainless steel cooling coil through which coolant material such as water, is circulated. In the carbamate condenser, unreacted ammonia and carbon dioxide enter the separator section, pass through a downcomer pipe and, as a result of cooling, condense and react to form an aqueous ammonium carbamate solution. This liquid stream exits from the bottom of the carbamate condenser as recycle to the urea reactor.

While it is preferred to employ only one carbamate condenser in the process of the present invention, it is to be understood that processes employing two such condensing zones are also applicable to the improved recycle process disclosed herein. When two carbamate condensing zones are employed, the aqueous urea solution withdrawn from the first of such zones is further depressurized to between about 0 p.s.i.g. and about 50 p.s.i.g. and heated to between about 80° F. and about 150° F. to vaporize additional quantities of water, ammonia and carbon dioxide in the second carbamate condenser. The procedure described above in the first carbamate condenser is repeated and the condensed ammonium carbamate withdrawn from the lower portion of the second carbamate condenser is repressurized and returned to the first carbamate condenser for mixture with ammonium carbamate condensed therein.

The remaining aqueous urea solution withdrawn from the last carbamate condenser or zone 14 is passed by line 28 through heater 30 wherein the solution is heated to a temperature of between about 190° F. and about 310° F., preferably between about 240° F. and about 300° F., after which the heated material is introduced into urea concentrating zone 32 for separation of a concentrated liquid urea solution from a vaporous solution containing ammonia, carbon dioxide and water. The urea solution separated in zone 32 is then passed by means of line 34 into urea evaporating zone 36, wherein, at a temperature above the crystallization temperature of urea and between about 270° F. and about 330° F., the remaining portion of water vapor is separated from the urea product and withdrawn from the evaporator through line 40. The urea product is recovered from the evaporator by means of line 38.

The vaporous mixture in concentrating zone 32 is passed to condenser 42 by means of valved line 44 wherein the vapors are totally condensed by indirect heat exchange with a coolant such as water. The condensate is then passed to holding drum 46 from which it is pressurized and pumped through line 44 into indirect heat exchanger 48 where it is heated in indirect heat exchange with a liquid stream hereinafter described and then into fractionating zone 50 for separation of carbon dioxide and ammonia vapors from water which remains as a liquid.

The gaseous effluent, containing mostly water, and which may or may not contain additional quantities of ammonia and carbon dioxide and which is separated in urea evaporating zone 36 can be added to the vapors entering condenser 42 by means of valved line 52. Thus, substantially all or a portion of the vapor in line 40 can be recycled to the system, if desired; otherwise, a portion or all of the vapors can be discharged from the process through valved line 54.

In fractionation zone 50 vaporous carbon dioxide and ammonia are separated from the water solution at a bottom temperature of between about 200° F. and about 500° F. under a pressure of from 0 to p.s.i.g. to about 600 p.s.i.g., for example 460° F. under 450 p.s.i.g. The vaporous mixture is withdrawn from zone 50 and recycled to carbamate condensing zone 14 for condensation therein by means of valved line 46. The water solution in zone 50 is withdrawn therefrom by means of line 58, after which it is passed in indirect heat exchange with aforementioned liquid entering the fractionation zone through line 44. A portion of the water, not required to maintain ammonium carbamate in solution in condensing zone 14 is withdrawn from the system through valved line 60 while the remaining portion is passed through heat exchanger 62 wherein the liquid is cooled to the approximate temperature employed in the carbamate condensing zone and then into adsorption zone 22 also by means of line 58. The total condensate and the adsorption solution in the carbamate condenser in then recycled to urea reactor under the conditions set forth above.

In certain cases, when it is desirable to dry the vaporous recycle stream from the fractionator, at least a portion of the anhydrous ammonia feed can be used as reflux to tower 50 by passing the liquid ammonia feed to the upper portion of the tower by means of valved line 64. In this way the danger of forming solid ammonium carbamate by condensing and recycling the vapors in line 56 is avoided.

Thus, a total recycle urea synthesis process is provided which is much more efficient and simplified than processes heretofore employed. It is to be understood that many modifications and alterations of the above-described process will become apparent to those skilled in the art without departing from the scope of this invention.

The following example carried out in accordance with the procedure described above and shown in the drawing, further illustrates this invention and it is not to be construed as limiting to the scope thereof.

Example 1

Carbon dioxide and ammonia in a ratio of 1:6 are fed into reaction zone 2 wherein at a temperature of 265° F. under 2750 p.s.i.g., reaction takes place to provide a reaction mixture containing ammonium carbamate, water, urea and unreacted ammonia. The reaction mixture is withdrawn from the reactor and the pressure reduced to about 300 p.s.i.g., after which the mixture is heated to about 250° F. for vaporization of ammonia and carbon dioxide reactants. These reactants are separated from the remaining aqueous urea solution and condense to reform ammonium carbamate in zone 14. The condensate is withdrawn from zone 14, pressurized to about 2800 p.s.i.g. and returned to the reaction zone as a part of the feed thereto, at a temperature above the crystallization temperature of the ammonium carbamate solution.

A portion of the separated vapors in zone 14, about 3 percent, is withdrawn and passed to an adsorption zone containing water, which serves as an absorption for $NH_3$ and $CO_2$ components in the vapor while rejecting inert gases. The resulting solution is returned to the carbamate condenser after venting inert gaseous materials from the absorption zone.

The aqueous urea solution is then depressurized and heated to a temperature of about 250° F. and passed to concentrating zone 32 which is maintained at about 70 p.s.i.g. for separation of the remaining ammonia and carbon dioxide components from the concentrated aqueous urea solution. The concentrated urea solution is then passed to evaporator 36, wherein at a temperature above the crystallization temperature of urea, the solution is evaporated to remove the remaining quantity of water and residual ammonia and carbon dioxide as a vapor and the urea is recovered as a product of the process.

The vapors removed in the evaporating zone and the concentrating zone are admixed and condensed, after which the resulting condensate is heated and passed to fractionator 50 wherein, at a bottom temperature of about 460° F. under 480 p.s.i.g. ammonia and carbon dioxide are separated, as a vaporous mixture from water which remains as the liquid phase. The vaporous mixture from zone 50 is then recycled to carbamate condensing zone 14 in order to be condensed therein and ultimately recycled to the reactor with the ammonium carbamate condensate separated in zone 14. Thus, all of the carbon dioxide and ammonia reactant is returned to the reaction zone for conversion to urea.

A controlled amount of the water withdrawn from zone 50 and passed to line 58, for example about 10 cc. is recycled to the aforementioned absorption zone as the absorption medium therein and also for ultimate recycle to the reaction zone by the procedure outlined above.

Having thus described my invention I claim:

1. In the synthesis of urea wherein carbon dioxide is reacted with an excess, above the stoichiometric mole ratio of anhydrous ammonia in a urea reactor to produce a liquid mixture containing urea, ammonium carbamate, ammonia and water, the mixture is vaporized to decompose the carbamate and to separate a major portion of water, ammonia and carbon dioxide as vapors from an aqueous urea fraction, and the vapors are condensed to reform ammonium carbamate in a carbamate condensing zone, the condensate is recycled to the reactor under the pressure employed therein, a portion of the vapors are withdrawn from said condensing zone and passed to an absorption zone containing water wherein ammonia and carbon dioxide vapors are absorbed and inert gases are vented therefrom, the solution in the absorption zone is returned to the carbamate condensing zone for recycle with ammonium carbamate condensate, the aqueous urea fraction substantially free of ammonium carbamate is passed to a concentrating zone for separating water and the remaining portion of ammonia and carbon dioxide reactants as vapors from the aqueous urea solution, the method for recovering and recycling ammonia and carbon dioxide in admixture which comprises: condensing the vapors from the concentrating zone pumping the condensate to a fractionating zone wherein a vaporous ammonia and carbon dioxide admixture is separated from water which remains as a liquid, recycling the vaporous admixture to the carbamate condensing zone for condensation with ammonium carbamate therein and passing water from said fractionating zone to the absorption zone as the absorption medium therein.

2. The process of claim 1 wherein the water withdrawn from the fractionating zone is passed in indirect heat exchange with incoming condensate to heat the condensate prior to fractionation.

3. The process of claim 1 wherein a controlled amount of ammonia feed is passed to said fractionating zone to supply a more anhydrous recycle to the carbamate condensing zone.

4. In the synthesis of urea wherein carbon dioxide is reacted with an excess, above the stoichiometric mole ratio of ammonia in a urea reactor to produce a liquid mixture containing urea, ammonium carbamate, ammonia and water; the mixture is vaporized to decompose the carbamate and to separate at least about 85 percent of the water, ammonia, and carbon dioxide as vapors from an aqueous urea fraction and the vapors are condensed to reform ammonium carbamate in a carbamate condensing zone; the ammonium carbamate condensate is recycled to the reactor under the pressure employed therein; the aqueous urea fraction substantially free of ammonium carbamate is passed to a concentrating zone for separating water and the remaining portion of ammonia and carbon dioxide as vapors from the aqueous urea solution; and the aqueous urea solution is passed to an evaporating zone wherein the remaining portion of water is separated as a vapor from urea which is recovered as the product of the process, the method for complete recovery and recycle of ammonia and carbon dioxide in admixture which comprises: condensing the vapors from the concentrating and evaporating zones, pumping the condensate to a fractionating zone wherein a vaporous ammonia-carbon dioxide admixture is separated from water which is maintained in the liquid phase and recycling the vaporous admixture to the carbamate condensing zone for condensation therein and ultimate recycle to said urea reactor.

5. The process of claim 4 wherein two heating and carbamate condensing zones are used in series and the recycle vapors from the fractionation zone are returned to the second carbamate condensing zone.

6. The process of claim 1 wherein ammonia feed is employed as reflux to said fractionating zone to supply a more anhydrous recycle and feed to the urea reactor.

7. In the synthesis of urea wherein carbon dioxide is reacted with an excess, above the stoichiometric mole ratio, of ammonia in a urea reactor in the presence of recycled ammonium carbamate to produce a mixture containing urea, ammonium carbamate, ammonia and water; the mixture is depressurized to vaporize water, ammonia and carbon dioxide and to separate these vapors from an aqueous urea fraction in a first separating zone; the vapors are condensed to reform ammonium carbamate solution in a carbamate condensing zone; the condensate is recycled to the reactor under the pressure emloyed therein; a portion of the vapors are withdrawn from said condensing zone and passed to an absorption zone containing water wherein ammonia and carbon dioxide vapors are absorbed by the water and inert gases are vented therefrom; the solution in the absorption zone is returned to the carbamate condensing zone for recycle with ammonium carbamate condensate in the first separating zone; the aqueous urea fraction is depressurized to vaporize an additional quantity of water, ammonia and carbon dioxide and to separate these vapors from the remaining aqueous urea fraction in a second separating zone; the vapors in a second separating zone are condensed to reform ammonium carbamate solution in a second carbamate condensing zone; the second condensate is recycled to the first separating zone for admixture with the first condensate therein; a portion of the vapors are withdrawn from said second separating zone and passed to a second absorption zone containing water, wherein ammonia and carbon dioxide vapors are absorbed by water and inert gases are vented therefrom; the solution from the second absorption zone is returned to the carbamate condensing zone in the second separating zone for admixture with ammonium carbamate condensate; the aqueous urea fraction, substantially free of ammonium carbamate is passed to a concentrating zone for separation of water, and the major portion of the remaining ammonia and carbon dioxide as vapors from the aqueous urea solution; and the aqueous urea solution is passed to an evaporating zone wherein the remaining portion of water, containing trace amounts of ammonia and carbon dioxide is separated as a vapor from liquid urea which is recovered as a product of the process, the method for total recovery and recycle of ammonia and carbon dioxide reactants which comprises: condensing the vapors from the concentrating and evaporating zones, pumping the condensate to a fractionating zone wherein, at a bottom temperature of between about 200° F. and about 500° F., a vaporous ammonia-carbon dioxide mixture is separated from liquid water at a higher pressure than that employed in the second separating zone; and recycling the vaporous mixture to the carbamate condensation zone of said second separating zone for condensation therein and recycle with said secod ammonium carbamate condensate.

8. In the synthesis of urea wherein carbon dioxide is reacted with an excess, above the stoichiometric mole ratio of anhydrous ammonia in a urea reactor to produce a liquid mixture containing urea, ammonium carbamate, ammonia and water, the mixture is vaporized to decompose the carbamate and to separate a major portion of water, ammonia and carbon dioxide as vapors from an aqueous urea fraction, and the vapors are condensed to reform ammonium carbamate in a carbamate condensing zone, the condensate is recycled to the reactor under the pressure employed therein, a portion of the vapors are withdrawn from said condensing zone and passed to an absorption zone containing water wherein ammonia and carbon dioxide vapors are absorbed and inert gases are vented therefrom, the solution in the absorption zone is returned to the carbamate condensing zone for recycle with ammonium carbamate condensate, the aqueous urea fraction substantially free of ammonium carbamate is passed to a concentrating zone for separating water and the remaining portion of ammonia and carbon dioxide reactants as vapors from the aqueous urea solution, the method for recovering and recycling ammonia and carbon dioxide in admixture which comprises: condensing the vapors from the concentrating zone, pumping the condensate to a fractionation zone wherein a vaporous ammonia and carbon dioxide mixture is separated from water which remains as a liquid, refluxing said condensing zone with ammonia feed, recycling the vaporous ammonia and carbon dioxide mixture to the carbamate condensing zone for condensation therein and recycling the resulting condensate to the reactor as at least a part of the ammonia feed thereto.

9. The process of claim 8 wherein the ammonia reflux is in the hydrated state.

References Cited by the Examiner
UNITED STATES PATENTS

| | | | |
|---|---|---|---|
| 1,429,483 | 9/1922 | Bosch et al. | 260—555 |
| 1,898,093 | 2/1933 | Miller | 260—555 |
| 1,937,116 | 11/1933 | Hetherington | 260—555 |
| 2,527,315 | 10/1950 | McKay | 260—555 |
| 2,632,771 | 3/1953 | White | 260—555 |
| 2,913,493 | 11/1959 | Sze et al. | 260—555 |
| 3,005,849 | 10/1961 | Otsuka | 260—555 |

FOREIGN PATENTS 1,042,570  11/1958  Germany.

OTHER REFERENCES

Bland: Petroleum Processing, October 1952, pages 1457–60.

Bolotov et al.: Chem. Abstr., vol. 35 (1941), page 283 (abstr. of J. Chem. Ind., U.S.S.R., vol. 17, No. 7, page 25 (1949).

Frejaques: Chemie et Industrie, vol. 60 (1948), No. 1, complete article at pp. 22–35, pages 22–30 are relied on.

Otsuka et al.: 1,473, March 5, 1958 (Japanese patent), abstr. at C.A., vol. 53, col. 3070 (1959).

Tonn: Chemical Engineering, vol. 62, pages 186–190 (1955).

IRVING MARCUS, *Primary Examiner.*

DUVAL T. McCUTCHEN, NICHOLAS S. RIZZO,
*Examiners.*